United States Patent [19]

Kandybin et al.

[11] Patent Number: 5,470,378
[45] Date of Patent: Nov. 28, 1995

[54] SYSTEM FOR SEPARATION OF OXYGEN FROM ARGON/OXYGEN MIXTURE

[75] Inventors: Alexander I. Kandybin, Toledo, Ohio; Richard A. Anderson, Katonah, N.Y.; Daniel L. Reichley, Toledo, Ohio

[73] Assignee: Arbor Research Corporation, Ann Arbor, Mich.

[21] Appl. No.: 173,708

[22] Filed: Dec. 27, 1993

Related U.S. Application Data

[63] Continuation of Ser. No. 950,257, Sep. 22, 1992, abandoned.

[51] Int. Cl.$^6$ ............................................. B01D 53/047
[52] U.S. Cl. ......................... 95/100; 95/103; 95/105; 95/127; 95/130
[58] Field of Search ........................ 95/98, 100–105, 95/127, 130, 148; 96/121, 130, 133, 144

[56] References Cited

U.S. PATENT DOCUMENTS

| | | | |
|---|---|---|---|
| 2,882,244 | 4/1959 | Milton | 55/75 X |
| 3,331,190 | 7/1967 | Glew et al. | 55/75 X |
| 3,564,816 | 2/1971 | Batta | 55/75 X |
| 3,597,169 | 8/1971 | Savage | 55/75 X |
| 3,636,679 | 1/1972 | Batta | 55/75 X |
| 3,658,467 | 4/1972 | Maeck | 55/75 X |
| 3,996,028 | 12/1976 | Golovko et al. | 55/58 |
| 4,019,880 | 4/1977 | Rabo et al. | 55/75 X |
| 4,088,737 | 5/1978 | Thomas et al. | 55/75 X |
| 4,190,424 | 2/1980 | Armond et al. | 55/75 X |
| 4,477,265 | 10/1984 | Kumar et al. | 55/66 X |
| 4,519,813 | 5/1985 | Hagiwara et al. | 55/62 X |
| 4,529,412 | 7/1985 | Hayashi et al. | 55/66 X |
| 4,543,109 | 9/1985 | Hamlin et al. | 55/25 |
| 4,557,736 | 12/1985 | Sircar | 55/62 |
| 4,566,881 | 1/1986 | Richter et al. | 55/62 X |
| 4,589,888 | 5/1986 | Hiscock et al. | 55/62 X |
| 4,661,124 | 4/1987 | Hamlin et al. | 55/21 |
| 4,661,125 | 4/1987 | Haruna et al. | 55/62 X |
| 4,684,377 | 8/1987 | Haruna et al. | 55/26 |
| 4,685,939 | 8/1987 | Kratz et al. | 55/75 X |
| 4,737,167 | 4/1988 | Ohtani et al. | 55/75 X |
| 4,756,723 | 7/1988 | Sircar | 55/75 X |
| 4,781,735 | 11/1988 | Tagawa et al. | 55/62 X |
| 4,813,979 | 3/1989 | Miller et al. | 55/75 X |
| 4,880,443 | 11/1989 | Miller et al. | 55/62 X |
| 4,892,567 | 1/1990 | Yan | 55/75 X |
| 4,913,850 | 4/1990 | Puppe et al. | 55/75 X |
| 4,917,710 | 4/1990 | Haruna et al. | 55/62 X |
| 4,985,052 | 1/1991 | Haruna et al. | 55/62 X |
| 5,074,892 | 12/1991 | Leavitt | 55/25 |
| 5,137,549 | 8/1992 | Stanford et al. | 55/75 X |
| 5,203,887 | 4/1993 | Toussaint | 55/25 |
| 5,226,933 | 7/1993 | Knaebel et al. | 55/26 |

FOREIGN PATENT DOCUMENTS

| | | | |
|---|---|---|---|
| 54-061092 | 5/1979 | Japan | 55/66 |
| 02-275707 | 11/1990 | Japan | 55/66 |

*Primary Examiner*—Robert Spitzer
*Attorney, Agent, or Firm*—Harness, Dickey & Pierce

[57] ABSTRACT

A process for removing argon from a feed gas stream comprising oxygen and argon to yield a high purity oxygen stream and the system for carrying out the process. The process includes the steps of: (a) providing a feed gas of oxygen and argon at a temperature between −30° C. and 100° C. and a pressure between 5 psia and 160 psia; and (b) passing the feed gas over an adsorbent bed comprising a Ag ion exchanged type X zeolite wherein at least 80% of the available ion sites are occupied by Ag such that at least a portion of the argon in the feed gas is adsorbed by the adsorbent bed thereby leaving an oxygen-enriched gas stream.

14 Claims, 2 Drawing Sheets

SYSTEM FOR SEPARATION OF OXYGEN FROM ARGON/OXYGEN MIXTURE

This is a continuation of U.S. patent application Ser. No. 950,257, filed Sep. 22, 1992, now abandoned.

BACKGROUND OF THE INVENTION

The present invention relates to the use of adsorption as a means to generate high purity oxygen from air. More particularly, the present invention relates to the separation of oxygen from mixtures of argon and oxygen by the use of an adsorbent selective for argon over oxygen in a pressure swing adsorption technique.

Generally speaking, air comprises carbon dioxide and water vapor and a mixture of about 79% nitrogen, 20% oxygen and 1% argon. It is often desirable to have a gaseous product of relatively pure oxygen such as can be provided from the removal of other gases from air. Adsorbent process techniques using pressure swing adsorption and zeolite molecular sieves have been employed to remove the carbon dioxide, water vapor and nitrogen from air. While the removal of carbon dioxide, water vapor and nitrogen is straightforward, the removal or separation of argon from air using an adsorbent technique is difficult. Without removal of argon, the oxygen enriched product from air has a maximum purity of about 95%, the balance being argon, since the ratio of oxygen to argon in air is approximately 20 to 1.

Argon is difficult to separate from oxygen because argon has adsorptive and diffusive properties almost identical to oxygen. Hence, the generation of oxygen from air by adsorption techniques has heretofore been limited to the generation of oxygen having a purity of 95% or less and the only feasible method of producing high purity oxygen, i.e., greater than 95% pure oxygen, has been by the cryogenic distillation of air. However, cryogenic distillation of air is practical only when large production quantities of oxygen are required. There is a need for high purity oxygen in moderate or small quantities for example, in ferrous metal cutting and welding and in medical use. Conventional adsorption techniques provide oxygen of only about 90% purity. Thus, there remains a need for a novel adsorption technique that can economically provide oxygen of high purity and at moderate to small quantities.

Although pressure swing adsorption processes for gas separation and zeolite molecular sieves have been known, it has heretofore been believed that such techniques were not practical for the separation of argon from oxygen to provide enriched oxygen because argon and oxygen have almost identical adsorptive and diffusive properties. It has now been discovered, however, that the practical separation of argon from oxygen can be achieved by the use of a bed of silver exchanged zeolite type X. Further understanding of the present invention will be had from the following description taken in conjunction with the accompanying drawings.

SUMMARY OF THE INVENTION

In accordance with the present invention, a system and process for removing argon from a feed gas stream comprising oxygen and argon, to yield a high purity oxygen stream comprises the steps of:

a. providing said feed gas at a temperature between −30° C. and 100° C. and at a pressure between 5 psia and 160 psia; and b. passing said feed gas over an adsorbent bed comprising a Ag ion exchanged type X zeolite wherein at least 80% of the available ion sites are occupied by Ag such that at least a portion of the argon in said feed gas is adsorbed by the adsorbent bed thereby leaving an oxygen-enriched gas stream.

DESCRIPTION OF THE PREFERRED EMBODIMENTS

Figure 1:
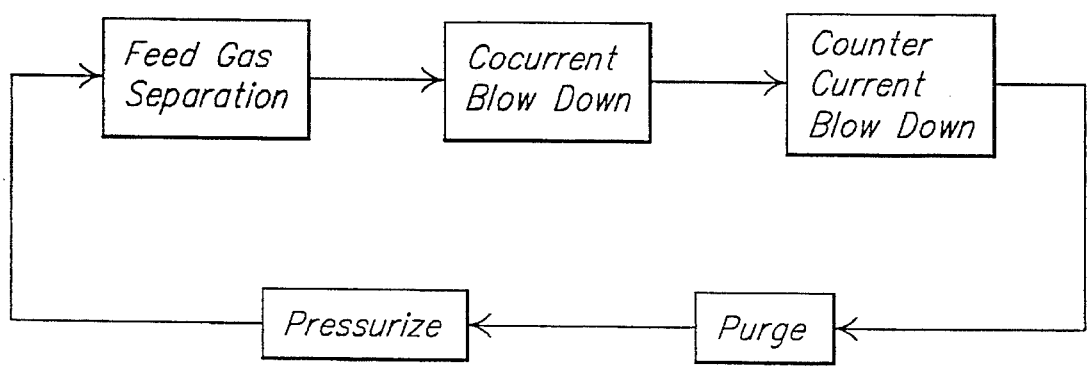
FIG. 1 is a flow chart illustrating the steps of a preferred method of the present invention.

In accordance with the present invention, argon is separated from a feed gas comprising a mixture of argon and oxygen by an adsorbent, preferably a 100% silver exchanged zeolite type X adsorbent. The process provides a practical method for generating high purity oxygen from air.

In a preferred embodiment of the present invention, there is provided a process for splitting oxygen from a gas comprising oxygen and argon according to a pressure swing adsorption procedure. Preferably the resulting oxygen product has a purity of at least 99.6%.

Pressure swing adsorption (PSA) is a well known method for separating gases. The separation is achieved by employing adsorbents which display a selectivity for one or more of the components in the gas stream. A separation of these components from the less strongly or non-adsorbed components can be achieved by passing the gas through a suitable bed of the preferred adsorbent. Eventually, the capacity of the adsorbent for the components being removed reaches equilibrium and no further separation is possible. The bed must be regenerated before it can be used again. This is commonly done by depressurization, which takes advantage of the physical laws of adsorption loading, and results in a desorption of the adsorbed species.

The actual practice of the unit operation of PSA (vacuum swing adsorption, VSA, is also applicable) usually employs two or more vessels to allow for continuous production. The practice has become more sophisticated as improvements in recovery and increases in productivity and reductions in energy requirements have led to cycle variations.

In a typical operation of a pressure swing adsorption column, four steps are followed. First, feed gas (which is to be separated) is delivered under pressure to a previously pressurized column at a feed end thereof. During this step, the gas to be separated (the secondary product or "heavy" gas) is adsorbed onto the selective adsorbent material, and the remaining gas (the primary product or "light" gas) escapes through the product end of the column. As the feed passes through the column, the more strongly adsorbed component ("heavy") is selectively taken up. At the other end of the column, a continuous stream of purified, less strongly adsorbed component is taken off. As the bed reaches capacity, the product stream is closed off, and the blowdown step occurs.

The second or countercurrent blowdown step occurs whereby the column is vented to decrease the pressure. The previously adsorbed secondary product gas readily escapes from the column into a lower pressure area.

Third, the column is subjected to a purge step whereby primary product gas is recycled through the column in a direction countercurrent to the feed step in order to remove any of the adsorbed product remaining in the column and to regenerate the adsorbent bed. The purge step ceases when the purge stream reaches the product end of the column, at which point a valve at the feed end is closed to commence the pressurization step.

During this fourth or pressurization step, purified product or feed gas continues to flow into the column. The column is pressurized by the purified primary product gas that is admitted through the product end of the column while the feed end is closed or pressurized by feed gas that is admitted through the feed end while the product end is closed. This completes one PSA cycle. The next cycle begins with the feed step described above, and the steps are repeated.

A second PSA column may be operated 180 degrees out of phase with the cycle in the first column. This allows for a continuous feed stream that alternates between columns, as well as a continuous product stream.

With all of the above in mind, it has become desirable to devise a method for using PSA to produce a high purity oxygen product from air. The three major components of air include nitrogen (about 79%), oxygen (about 20%) and argon (about 1%).

It is known in the art of PSA to produce a stream of enriched oxygen from air by using adsorbents such as zeolite 5A or 13X, both of which are selective to the nitrogen component of air. Since argon, like oxygen, is non-polar, it adsorbs in a similar manner to oxygen. As a result of this similarity, the argon is present in the product stream with the oxygen when nitrogen selective adsorbents are used. Such stream has an oxygen product purity of roughly 95%, with the remaining 5% being argon.

It has become desirable to develop a method of further purifying the oxygen according to a pressure swing adsorption process. With a feed gas comprising oxygen and argon at a molar ratio of about 20:1, the oxygen in such a method would become the primary product, and argon the secondary product. Such method would follow the PSA steps described above, or slight modifications thereto. The adsorbent used in such a method would be selective to argon. The separated oxygen would find usefulness in a variety of environments and applications such as in association with medical, industrial, aeronautical and experimental situations where highly purified oxygen is beneficial.

It is further desirable to develop a method for producing oxygen having at least a 99.6% purity at a recovery rate of at least about 25%. A desirable level of productivity would be at least 10 standard m³ of product per m³ of adsorbent employed per hour.

The present invention contemplates a method for recovering relatively high-purity oxygen from a gas comprising oxygen and argon at a ratio of about 20:1. The method involves a pressure swing adsorption system using an adsorbent material selective to argon.

Although it is contemplated that the process of the present invention will be most economical in a pressure swing adsorption process, broadly speaking, the process of the present invention can be used in pressure swing adsorption, vacuum swing adsorption and other adsorption processes. Furthermore, the process can be a single or multiple bed adsorbent process, a batch or continuous process and can be carried out with or without regeneration of the adsorbent bed.

The adsorbent used in the process is a Type X zeolite or molecular sieve which has been cation exchanged with Ag to provide a AgX zeolite. Type X zeolites are well known and include types 13X, 10X, etc. The sodium form of Type X zeolite is commonly used in pressure swing adsorption air separation processes to separate nitrogen from oxygen/argon, as also are ion exchanged X-zeolites CaX, SrX, BaX, NiX and LiX.

Preferably, a NaX type zeolite is used for the ion exchange although other type X zeolites can be used. The ions can be exchanged concurrently or sequentially, for example by exchanging a NaX zeolite with calcium to produce a CaX zeolite which is then exchanged with Ag to provide AgX zeolite. The Ag cations can be exchanged in a conventional manner from a solution of a suitable silver salt, e.g., silver nitrate. After the exchange has been accomplished, the Ag type X zeolite is dehydrated to an active form whereupon it exhibits a selectivity for argon over oxygen.

Another unique feature of this invention, i.e., the process of using AgX as an adsorbent to separate argon from oxygen to produce high purity oxygen, is that the AgX product possesses a three dimensional pore structure which provides for more rapid mass transfer rates versus most conventional adsorbents. These higher mass transfer rates allow for the compounding of adsorbent materials within the same bed to provide in one vessel the continuous production of high purity oxygen. Thus, the inlet (or feed) end of the adsorber vessel would contain a conventional nitrogen adsorbent, such as NaX, CaA, or any of the others mentioned previously, and this would be followed by the AgX towards the outlet end of the bed to remove the argon from the nitrogen depleted argon/oxygen mixture. If the rate of argon adsorption on the AgX were not very rapid, the marriage of the two adsorbents in the same vessel would result in design incompatibilities that would lead to an inoperable or economically unacceptable cycle. The reason being that, if the argon sorption on the AgX were not very rapid (which has been discovered), then the relative amount of the nitrogen sorption section to the argon sorption section would become very large. Thus, incorporation in one vessel would become uneconomic and multiple vessel systems would be required thereby losing all the advantages of the use of a single vessel for both separations.

In a pressure swing adsorption process of the present invention, a feed gas comprising oxygen and argon is caused to flow through a bed of silver exchanged type X zeolite. The column and bed have been previously pressurized. The bed adsorbs both argon and oxygen but preferentially adsorbs argon to thereby provide an initial product gas that has substantially reduced argon concentration. It is believed that the present process can produce a product gas stream of greater than 99% oxygen and less than 1% argon. Of course, as the feed gas flows through and argon is removed by the bed, eventually the entire bed is in equilibrium with the argon in the feed gas and the bed is no longer effective to separate argon from the feed gas. The product gas output is shut off before this state is reached and the bed is regenerated.

Regeneration of the bed begins by venting the column to lower the pressure therein. The bed is then preferably flushed in a countercurrent blowdown step by passing product gas therethrough in the reverse direction to further remove argon therefrom and to regenerate the bed. The outlet valve used for this purge is then closed.

The bed is then purged by flowing product gas in a countercurrent direction through the bed to further remove argon therefrom and to regenerate the bed. The bed is then pressurized by continuing to flow product gas into the column. Once pressurized, the bed is ready to be reused.

In accordance with a more preferred aspect of the invention, a process for splitting oxygen from a feed gas such as air comprising oxygen and argon calls for a series of pressure swing adsorption steps. The steps of a preferred embodiment comprise a modification of the standard steps described above. Such preferred embodiment calls for five steps and is illustrated in FIG. 1.

Figure 2:
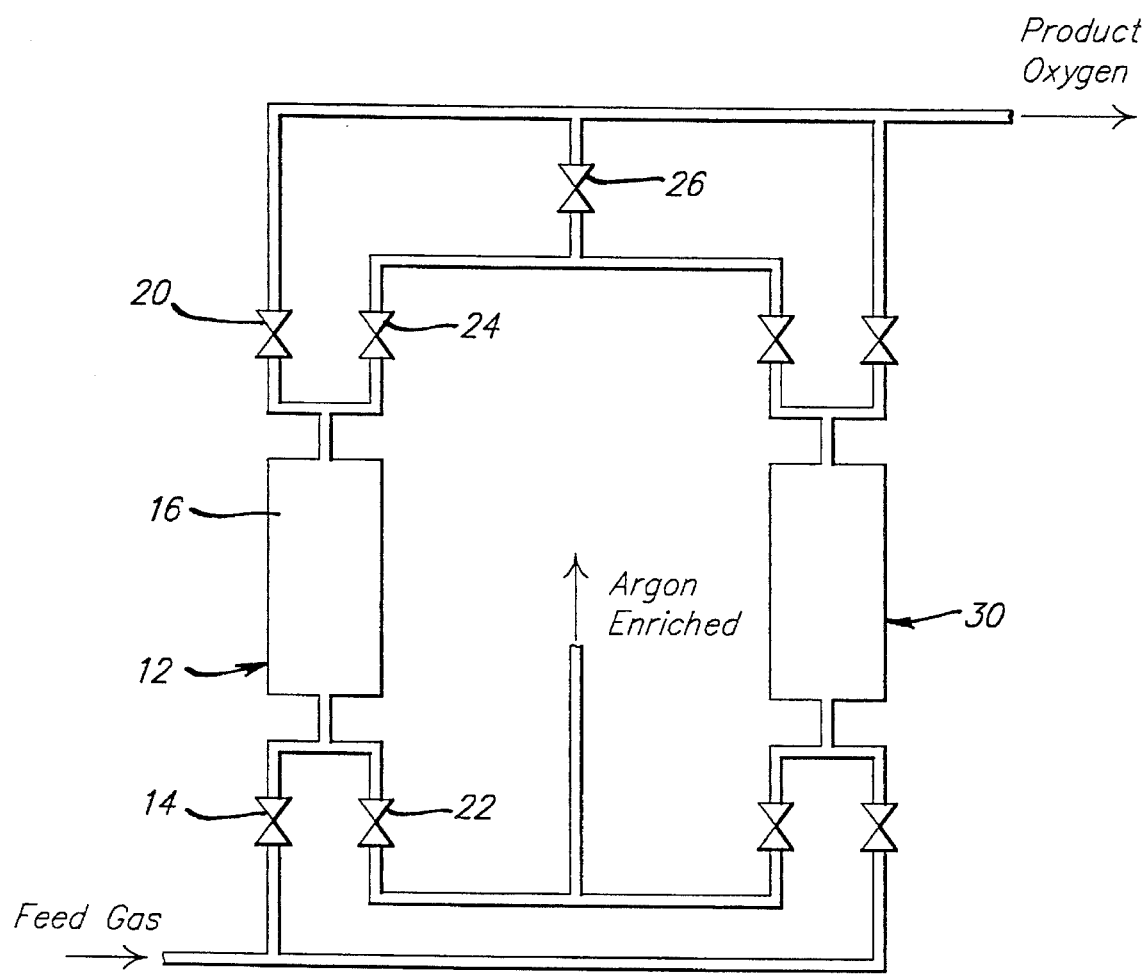
FIG. 2 is a somewhat diagrammatical representation of a preferred pressure swing adsorption system of the present invention.

Now referring to FIG. 2, first, a feed gas is supplied to a PSA column 12 through a feed end thereof through valve 14. Column 12 includes a bed 16 of silver X zeolite, an adsorbent selective to argon. The feed gas may comprise air or, in the alternative, the predominately oxygen/argon product remaining after nitrogen has been separated out. In any event, the feed comprises oxygen and argon in about a 20:1 ratio. As the feed passes through the column, the argon is adsorbed onto the argon-selective adsorbent. An oxygen-rich effluent exits through a product end of the column through vane 20. A front of argon proceeds through the column, but before it reaches the product end of the column to exit with the oxygen-rich effluent, valve 14 at the product feed end of the column is closed.

Second, the column undergoes cocurrent blowdown vane 20 is still open. Hence, a relatively pure stream of oxygen escapes through the product end of the column to a lower pressure vessel.

Third, the column is subjected to countercurrent blowdown. By this, a feed end of the column is opened, vane 22 is open, valve 20 is closed, and the previously separated argon which has been adsorbed onto the adsorbent escapes from the column, perhaps to a lower pressure tank.

Fourth, the column is purged with primary product oxygen gas valve 24 is open, valve 22 is open. Any argon remaining in the column is forced out as effluent. The resulting exit stream may be flowed to a purge waste tank or vented to the atmosphere.

Fifth, the PSA column 12 is pressurized with a gas that is a combination of gases from two sources. One such source is that of the feed product. The other source is the effluent from the cocurrent blowdown step, valves 14 and 24 open, valves 22 and 20 closed.

In another embodiment of the invention, the pressurization may be conducted in a two step manner. The bed is initially pressurized with the cocurrent blowdown product, valves 20 and 26 open. This is then followed by pressurization with the feed gas valves 20, 24 and 26 closed, vane 14 open, from the feed step. The intent behind pressurizing using the combination or sequential feeding of the feed product and cocurrent blowdown product is to prevent argon from contacting and contaminating the product end of the column.

The cycle is then repeated. In actual practice, a second column 30 may operate at 180 degrees out of phase with the first column. Additional columns may also be used.

It should be noted that the diagram shows a two bed system to allow continuous operation. The valve sequences described above can easily be transposed to the operation of column 30.

As discussed above, it is within the scope of this invention to have already split off the nitrogen from the air, feeding the column a gas comprising substantially 95% oxygen and 5% argon. It is also within the scope of this invention to include a "compound" bed inside the column. By this, the bed would be comprised of an adsorbent selective to nitrogen and another adsorbent selective to argon. The separation could occur in separate beds or a single bed.

A principal advantage of the present invention is the ability to recover high-purity oxygen from a gas such as air comprising oxygen and argon at a ratio of about 20:1.

Figure 3:
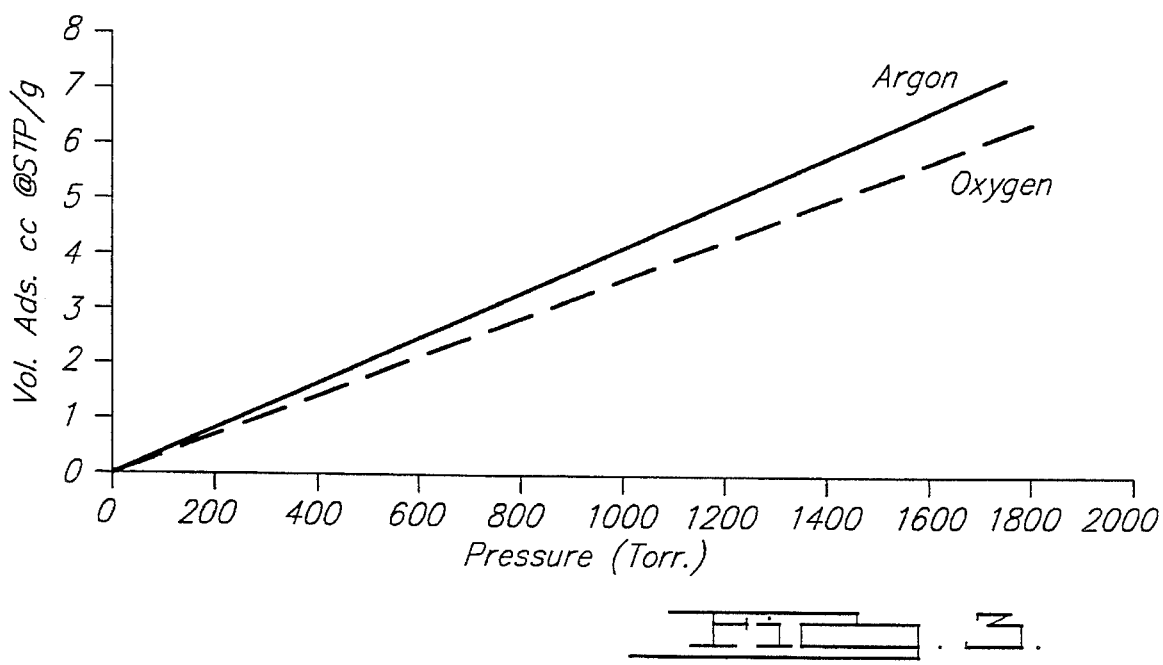
FIG. 3 is a graph showing the volume of argon and oxygen adsorbed by a preferred adsorbent of the present invention.

Now referring to FIG. 3, the selectivity of AgX for argon over oxygen is illustrated. Presented are the isotherms for argon and oxygen on a AgX sample at 30°. The X-axis is the pressure in Torr at which the test measurement was made. The Y-axis of the graph is the volume, converted to cc at standard temperature and pressure of gas, i.e., argon or oxygen adsorbed per gram of adsorbent at equilibrium. FIG. 3 illustrates that AgX has a selectivity of greater than 1.2 for argon over oxygen. This indicates to those skilled in the art that AgX exhibits sufficient selectivity upon which to base a PSA separation process for the generation of high purity oxygen.

Figure 4:
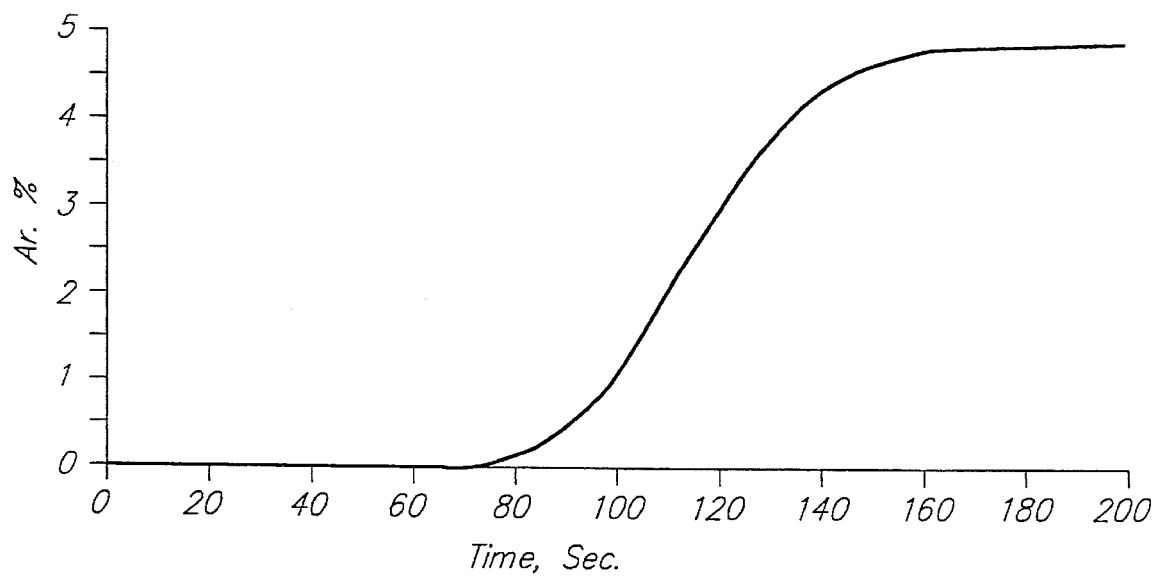
FIG. 4 is a graph showing the breakthrough curve of an oxygen/argon gas mixture in a column using a preferred adsorbent of the present invention.

FIG. 4 is a graph showing the dynamic breakthrough curve for an argon/oxygen feed gas mixture. The Y-axis is the percent of the argon in the gas mixture leaving the exit end of the column and the X-axis is time in seconds from the introduction of feed gas flowing into the column.

Further understanding of the present invention will be had from the following examples.

EXAMPLE

The process of this run was to demonstrate that the AgX adsorbent would produce high purity oxygen from an argon/oxygen mixture on a dynamic basis. Conceptually, this was achieved by assuming that the production of a 95% oxygen and 5% argon mixture by conventional PSA to remove the nitrogen from an air feed stream had taken place in a previous step or on an adsorbent section which proceeds the AgX in the vessel. Thus, the AgX section could be fed the 95/5 oxygen/argon mixture directly. Therefore the ability of the AgX to remove the argon from the mixture and to produce high purity oxygen could be demonstrated.

In this case, prior to introducing the 95/5 oxygen/argon mixture to the bed, the bed voids and adsorbent were filled with pure oxygen at 30° C. This condition would correspond to the state of the adsorbent at the end of the desorption, purge cycle and repressurization. Thus, the feeding of the 95/5 oxygen/argon mixture to the AgX would correspond to exactly the operation of the AgX in the envisioned commercial process.

In the test run illustrated here, the 95/5 oxygen/argon mixture was fed at 30° C. to the bed of AgX which had been preloaded with oxygen at 30° C. The effluent argon content, measured continuously on a mass spectrometer, was initially zero, as would be expected for a bed preloaded with oxygen. The expected breakthrough of argon, if no adsorption took place would occur at 15 seconds, plug flow assumed. It is obvious that the bed continued to provide pure oxygen past 70 seconds. This was followed by a typical "S"-shaped breakthrough curve to the 5% argon concentration employed in the feed mixture. The "stoichiometric" time, i.e., the time at which a square front would break through, is at 115 seconds. The stoichiometric loading corresponding to this time is calculated at 0.53 cc/gm, which corresponds well with the isotherm value of 0.5 cc/gm obtained from FIG. 3.

A definitive proof of the selective adsorption of the argon over the oxygen can be generated by performing a material balance around the test results. To do this the total oxygen generated at the effluent of the bed from the start of the test of the stoichiometric point is determined. This is compared with the total amount of oxygen in the bed at the start of the test. If the run generated more oxygen than was stored in the bed, the production of pure oxygen from a 95/5 oxygen/argon mixture has been demonstrated. The material balance follows:

| Bed Volume: | |
|---|---|
| Solid phase | 50.8 cc |
| Voids | 118.6 cc |
| Total | 169.4 cc |
| Oxygen in Voids: (from Ideal Gas Law) | |
| 118.6 × $O_2$ Density at T & P = 280.0 cc | |
| Oxygen or Adsorbent: (from Henry's Law & Isotherm) | |
| 0.06243 moles = 1398 cc | |
| Total Oxygen in Column at Start of Run: = 1678.0 cc | |
| Oxygen Product in Effluent: (to stoichiometric point) | |
| 1090 cc/min × 115 minutes = 2089.0 cc | |

Therefore, argon can be separated from oxygen on AgX adsorbent, and to one skilled in the art, a pressure swing adsorption cycle (PSA or VSA) can be developed to provide for the production of high purity oxygen.

What is claimed is:

1. A process for removing argon from a feed gas stream comprising oxygen and argon to provide an oxygen-enriched gas stream, said process comprising:
   a. providing said feed gas at a temperature between about −30° C. and about 100° C. and at an elevated pressure; and
   b. passing said feed gas over an adsorbent bed comprising a Ag ion exchanged type X zeolite wherein at least about 80% of the available ion sites are occupied by Ag ions such that at least a portion of the argon in said feed gas is adsorbed by the adsorbent bed thereby leaving an oxygen-enriched gas stream.

2. The process of claim 1 wherein said adsorbent bed is pressurized to between about 5 psia to about 160 psia before said step (a).

3. The process of claim 2 wherein said adsorbent bed is depressurized and subsequently purged with an oxygen-enriched gas stream to remove argon from the bed to thereby regenerate the bed.

4. The process of claim 3 wherein at least about 95% of the available ion sites are occupied by Ag ions.

5. The process of claim 4 wherein at least about 99% of the available ion sites are occupied by Ag.

6. The process of claim 2 wherein at least a pair of beds are used to provide one bed with output while the other bed is subjected to depressurization and purging.

7. The process of claim 1 wherein said feed gas comprises about 95% oxygen and about 5% argon.

8. The process of claim 1 wherein said feed gas is provided by passing a gas stream over an adsorbent bed comprising zeolite adsorbent selection for nitrogen.

9. The process of claim 8 wherein said zeolite adsorbent is a Li ion exchanged Type X zeolite.

10. In a pressure swing adsorption process for the separation of argon from a feed gas comprising oxygen and argon in a cyclic operation, the sequential steps of:
    a. passing a feed gas comprising oxygen and argon through a column containing an adsorbent bed of Ag ion exchanged type X zeolite under a condition of elevated pressure;
    b. subjecting the column to a cocurrent blowdown;
    c. subjecting the column to a countercurrent blowdown;
    d. purging the column; and
    e. repressurizing the column with said feed gas.

11. The process of claim 10 wherein said bed comprises type X zeolite having at least 80% of available ion sites exchanged with Ag ion.

12. The process of claim 11 wherein at least 99% of said ion sites are occupied by Ag ions.

13. The process of claim 12 wherein said feed gas in said column in step "a" is under a pressure of between about 5 psia and 160 psia.

14. The process of claim 13 wherein said feed gas in said column in step "a" has a temperature of from about −30° C. to about 100° C.

* * * * *